March 3, 1970     R. H. FERNEAU ET AL     3,498,628
CART FOR CONVEYING AND USING ARTICLES OF MERCHANDISE
Filed Oct. 4, 1967     6 Sheets-Sheet 1

INVENTORS
Richard H. Ferneau
BY George A. Selig
Wood, Herron & Evans
ATTORNEYS

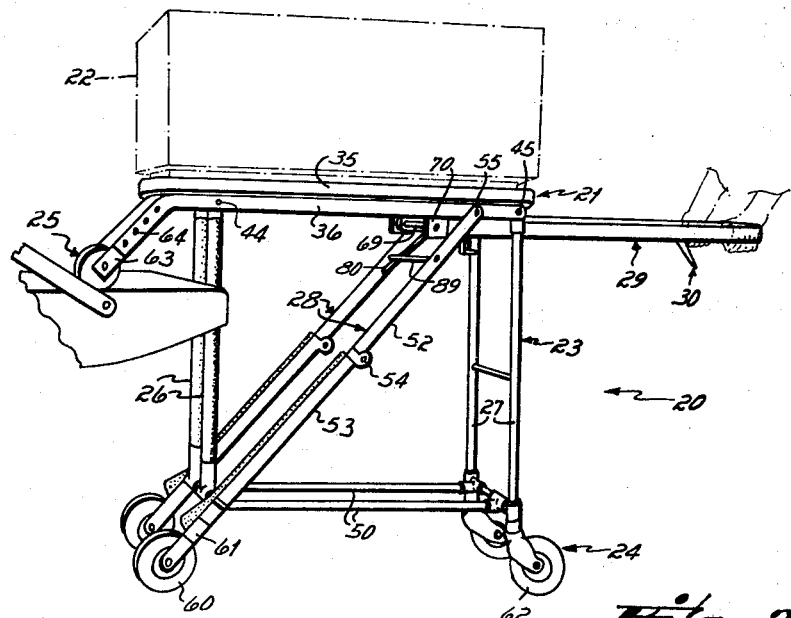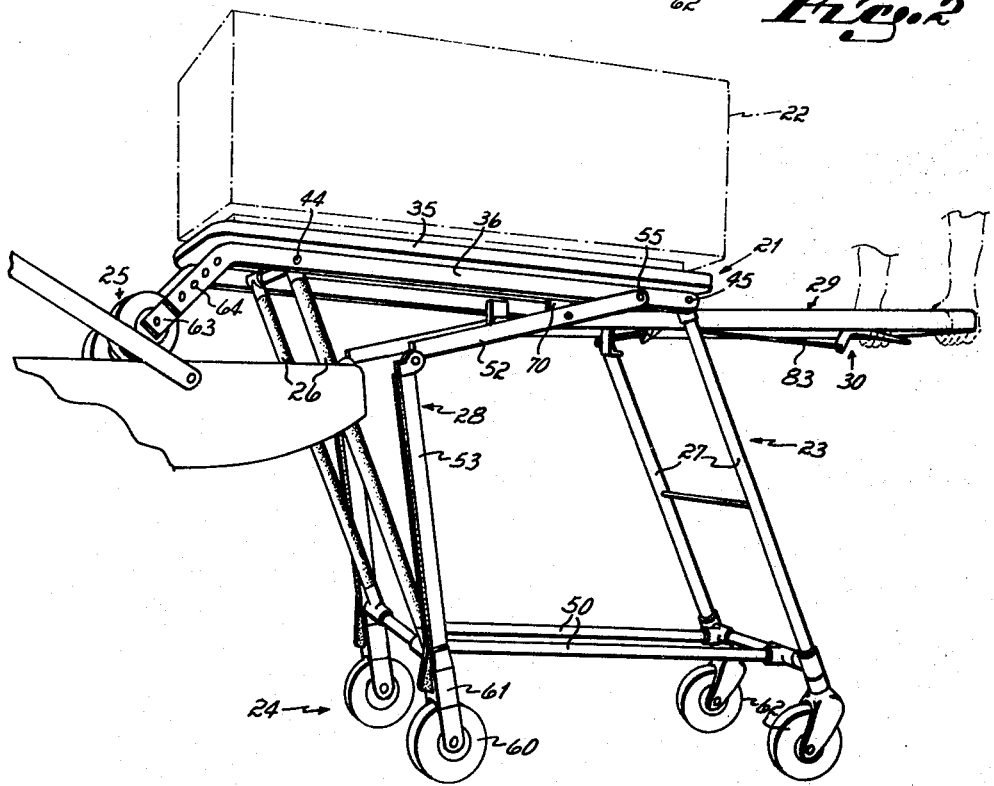

March 3, 1970 R. H. FERNEAU ET AL 3,498,628
CART FOR CONVEYING AND USING ARTICLES OF MERCHANDISE
Filed Oct. 4, 1967 6 Sheets-Sheet 5

INVENTORS
Richard H. Ferneau
BY George A. Selig
Wood, Herron & Evans
ATTORNEYS

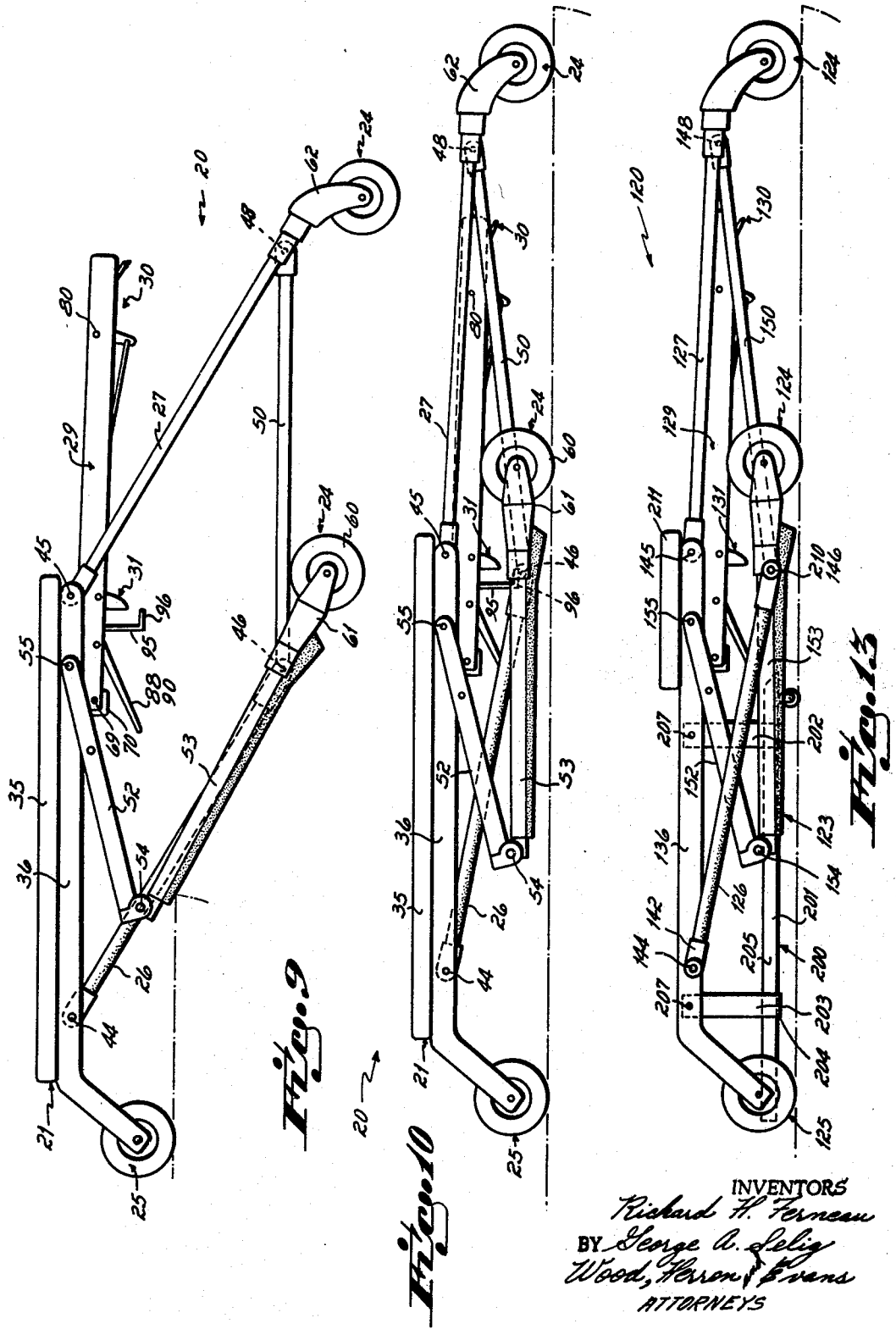

March 3, 1970 R. H. FERNEAU ET AL 3,498,628
CART FOR CONVEYING AND USING ARTICLES OF MERCHANDISE
Filed Oct. 4, 1967 6 Sheets-Sheet 6

INVENTORS
Richard H. Ferneau
George A. Selig
BY
Wood, Herron & Evans
ATTORNEYS

United States Patent Office 3,498,628
Patented Mar. 3, 1970

3,498,628
CART FOR CONVEYING AND USING ARTICLES OF MERCHANDISE
Richard H. Ferneau and George A. Selig, Washington Court House, Ohio, assignors to Burt Weil, Cincinnati, Ohio
Filed Oct. 4, 1967, Ser. No. 672,898
Int. Cl. B62b 3/02, 3/04
U.S. Cl. 280—36                        8 Claims

ABSTRACT OF THE DISCLOSURE

A cart for heavy articles, the cart having four vertical legs which are adapted to be swung to a generally horizontal attitude to permit the collapse of the cart, the cart having a horizontal rearwardly projecting handle which is adapted to be swung downwardly to a generally vertical attitude.

BACKGROUND OF THE INVENTION

Figure 1:
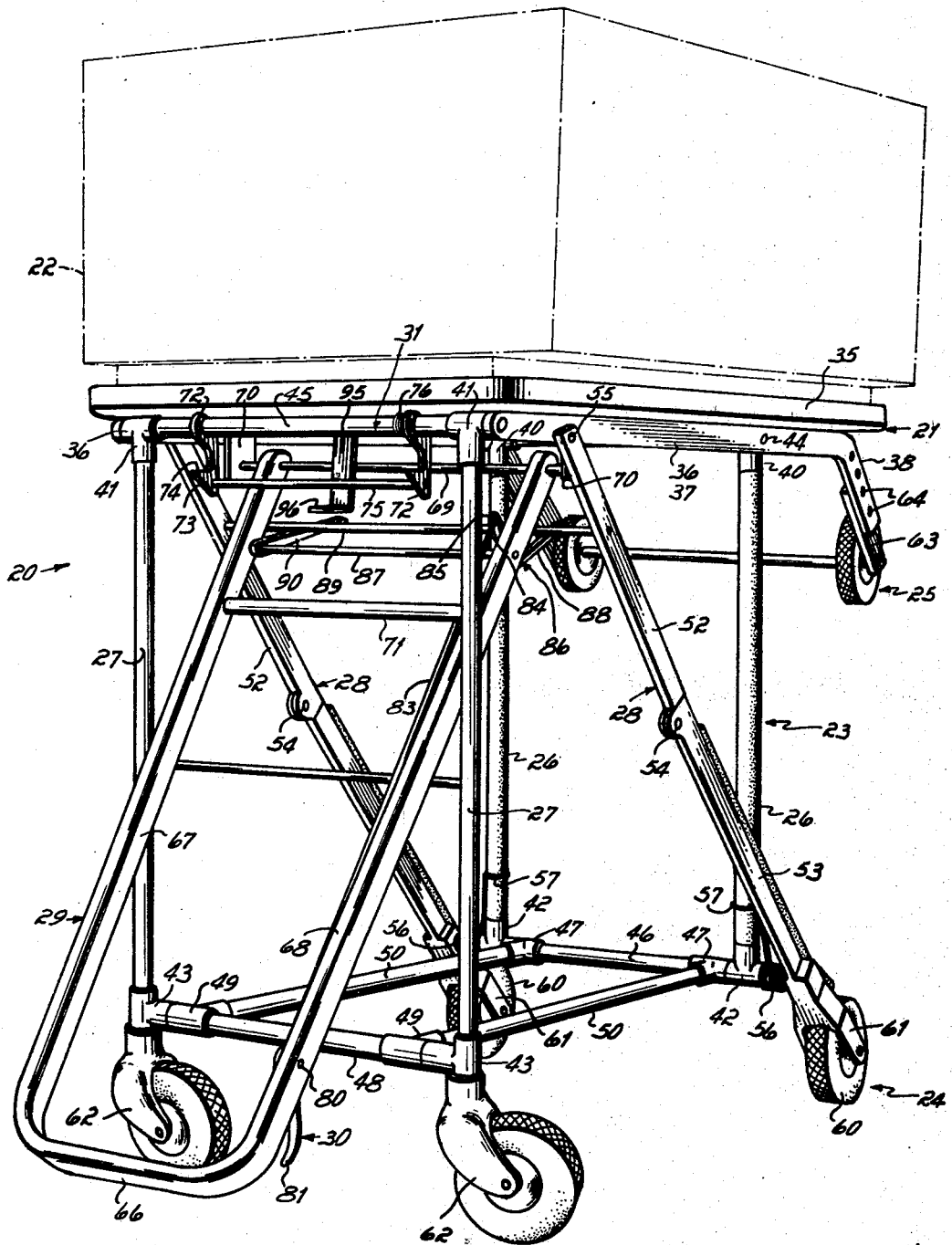

This invention relates to a cart for transporting and demonstrating articles of merchandise.

In some respects the cart of the present invention is similar to the cart disclosed in Weil Patent No. 2,877,048. The cart of that patent is adapted for the transportation of human bodies and is particularly adapted for operation by one man who can roll the cart up to a transporting vehicle and thrust the cart into the vehicle with the supporting legs collapsing and swinging rearwardly as the cart is supported at one end by auxiliary wheels and at the other end by the one man.

It has been an objective of the present invention to provide a cart of this general nature for transporting and using or demonstrating articles of merchandise. For example, there are many types of articles weighing up to about four hundred pounds which can best be sold by transporting them to and demonstrating them at the location of the potential customer. Such articles include cash registers, calculators, photocopying machines, and the like. Similarly, other heavy articles need to be conveyed from place to place and used at a destination as, for example, scientific instruments, wardrobe trunks, and the like.

Conveyances for such articles have, of course, been available for years. Such conveyances include two-wheeled trucks and four-wheeled dollies. These conveyances, however, have required more than one person to lift the heavy articles from a vehicle to the conveyance and again from the conveyance to a table or the like upon which the article will be used.

The cart of the present invention is not subject to these limitations for it is ideally suited to the handling of quite heavy articles by one man including the removal of the article from the vehicle, the conveying of the article to its destination, and at the destination the cart serving the function as an elevated support for the article during its use.

These features of the invention are attained by providing a cart having a table upon which the article is supported, the table having auxiliary wheels which facilitate its moving in and out of a vehicle, the table having a rearwardly projecting handle which provides the leverage for the support of heavy articles as they are being moved in and out of a vehicle, the handle being pivotable downwardly to a vertical attitude in which it is out of the way so as to permit movement around the cart to use or demonstrate the article. The invention further provides an operating lever mounted on the handle for effecting the collapse of the depending legs upon which the cart is supported as the cart is thrust into the vehicle.

A further feature of one embodiment of the invention resides in the provision of a recessed table which presents the auxiliary wheels and supporting handle at the proper height for introduction into a vehicle but which also provides the lowest possible plane for the support of the article so that the cart can accommodate articles of maximum height consistent with the height of the opening of a station wagon or the like.

Figure 4:
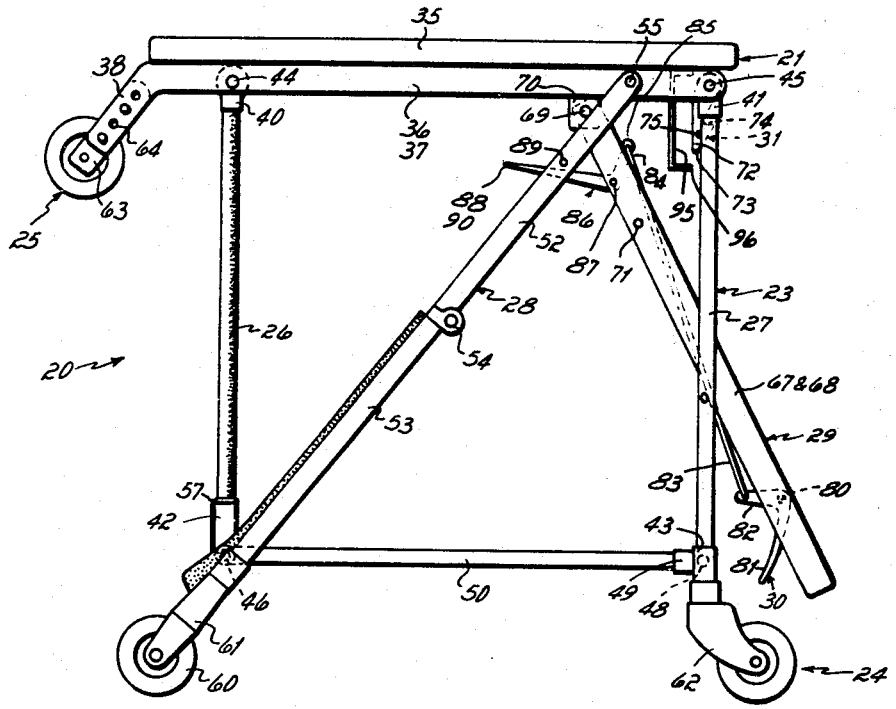
Figures 5, 6:
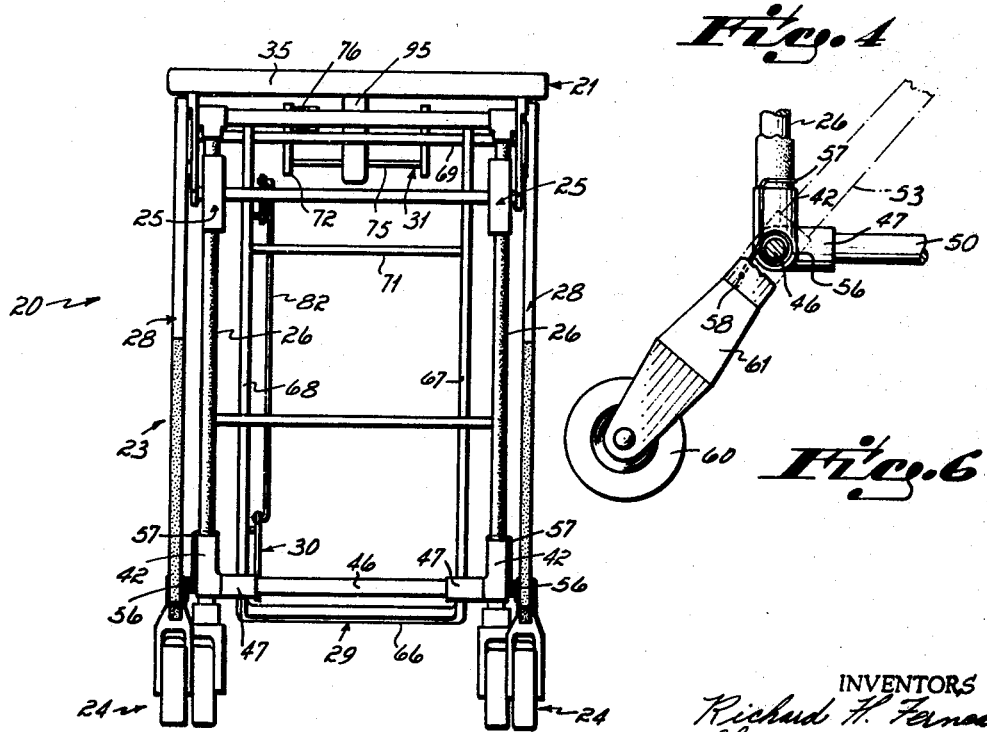
Figures 11, 12:
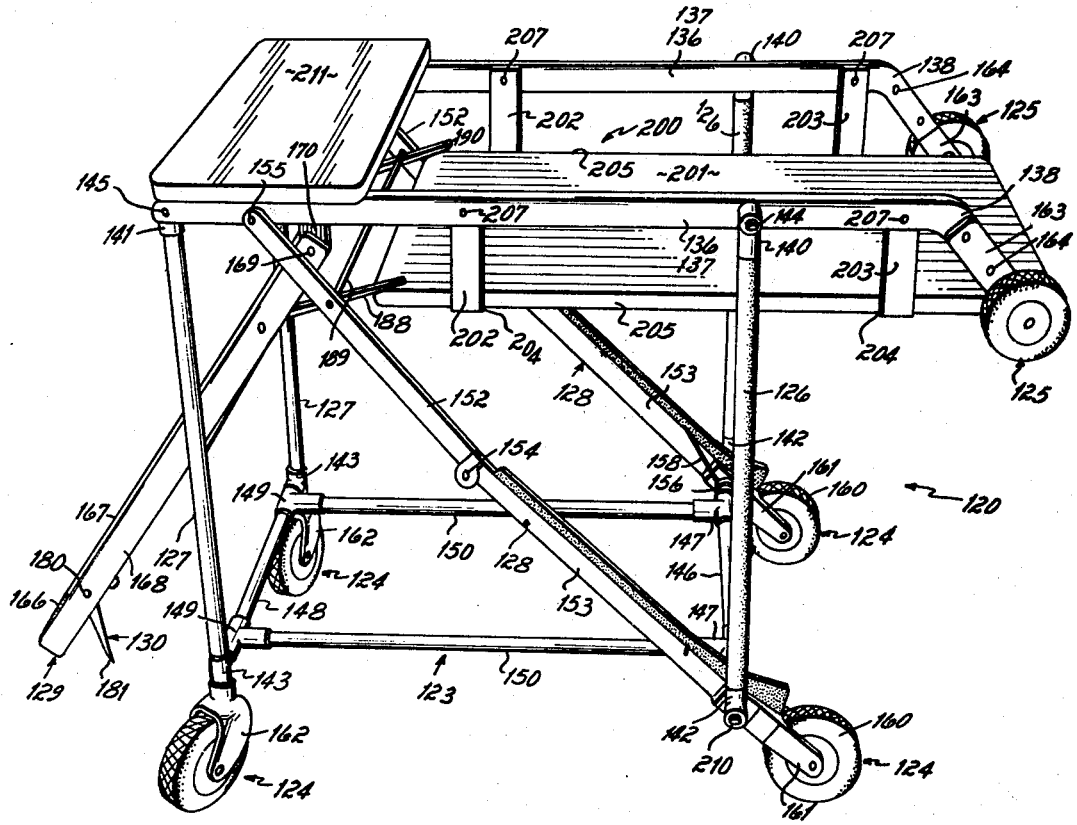

The several features of the invention will become more readily apparent from the following detailed description taken in conjunction with accompanying drawings in which:

FIG. 1 is a perspective view of the invention;
FIGS. 2 and 3 are perspective views of the invention illustrating a manner in which it is moved into and out of a vehicle;
FIG. 4 is a side elevational view of the invention;
FIG. 5 is a front end elevational view of the invention;
FIG. 6 is a fragmentary side elevational view of the front wheel structure;
FIGS. 7–10 are side elevational views of the invention illustrating the articulation of the respective elements as the supporting legs move from their vertical orientation to a generally horizontal orientation;
FIG. 11 is a perspective view of an alternative embodiment of the invention;
FIG. 12 is a front end elevational view of the alternative embodiment; and
FIG. 13 is a side elevational view of the alternative embodiment in its collapsed condition.

GENERAL DESCRIPTION AND OPERATION

Reference is directed to FIG. 2 for the purpose of a general description of a cart of the present invention as indicated generally by the numeral 20. The cart 20 includes a table structure 21 which supports an article of merchandise 22, a generally rectangular framework 23, a plurality of ground engaging wheels indicated generally by the numeral 24, and a pair of auxiliary wheels 25.

The table structure 21 is supported by the framework 23 which includes front and rear legs 26 and 27 and cooperating diagonal braces 28. The legs 26 and 27 are pivoted at their upper ends to the table structure 21 and support wheels 24 at their lower ends.

Auxiliary wheels 25 are mounted on the forward end of the table structure 21. At the rear end of the table structure 21, a handle 29 is pivotally mounted and carries an operating lever 30. The lever 30 is connected to braces 28 by a linkage and is operative to release the braces and to permit a rearward swinging and collapsing of the framework 23.

A latch structure 31 (FIG. 7) is provided to retain the handle 29 in its raised position. When the handle is lowered as shown in FIG. 4, the overall length of the cart is substantially reduced.

The simplicity of operation and ease of handling of the cart 20 enables one man conveniently to transport a heavy article from one place to another and to use the article while it is on the cart as, for example, in sales presentations to prospective customers. Assume for the purpose of this discussion that a salesman is in his office and making the preparations for a sales presentation. The merchandise to be presented is placed upon the table structure 21 of the cart 20, the handle 29 is raised and latched, and the cart pushed to a station wagon or the like.

With the handle raised and the auxiliary wheels 25 placed upon the floor of the wagon, the lever 30 is operated to permit the legs 26 and 27 of the framework 23 to be forced from their vertical attitude to a substantially horizontal attitude. The legs are forced to swing from their vertical attitude by a continual thrust applied against them as the cart is pushed along the floor of the station wagon while it is supported at its rear end by the salesman grasping the handle 29.

At a prospective customer's plant, the loading procedure is reversed. That is, the cart is pulled from the station wagon and in so doing the legs 26 and 27 will fall by gravity to their vertical attitude. With the cart erected, it may be wheeled to the prospective customer's office, and the handle 29 lowered to its demonstrative position. It should be noted that the lowering of the handle 29 permits the cart to be carried in small elevators and moved around tight corners.

Lowering of the handle shortens the overall length of the cart so that the salesman has the freedom necessary to make a smooth, graceful presentation of his merchandise. After a presention is completed, the handle is lifted, and the cart pushed from the office. Thus, a prospective customer is impressed with an efficient unobtrusive maneuver by the salesman.

SPECIFIC DESCRIPTION OF STRUCTURAL DETAILS

Referring now to FIGS. 1-3, 5 and 6 generally, and to FIG. 1 in particular where the cart 20 is depicted in a demonstrative condition supporting an article of merchandise 22, indicated by phantom lines, the article of merchandise is resting upon a table 35 which is rigidly secured (by means not shown) to a pair of longitudinal beams 36—36 of the table structure 21. Each beam 36 has a horizontally disposed straight section 37 that extends along each lateral side edge of the table 35. An angulated portion 38 extends forward of the table 35 and is inclined downwardly below its lower surfaces.

The legs 26 and 27 have T-fittings 40, 41 on their upper ends and similar T-fittings 42, 43 on their lower ends, respectively. The front leg fittings 40 are pivotably secured to each beam 36 by stub shafts 44. At the rear, T-fittings 41 are rotatably mounted at the ends of a transverse tie bar 45 which is anchored within each beam 36. T-fittings 42 on the lower ends of the front legs 26 are rotatably mounted on a front axle 46. A pair of additional T-fittings 47 are centrally disposed on the axle 46 and are rotatably secured thereto. The T-fittings 43 at the lower ends of rear legs 27 have heir stems rotated 90° with respect to the upper T-fittings 41, and are rotatably mounted on a rear axle 48. Axle 48 has a pair of T-fittings 49 rotatably secured thereto and in cooperation with the T-fittings 47 of front axle 46 support a pair of longitudinal tie bars 50 which interconnect the front and rear legs. Each bar 50 is rigidly fixed within the stems of the T-fittings 47 and 49.

The front and rear legs 26 and 27 are maintained in a vertical attitude by the pair of toggle braces 28, a brace 28 being located on each side of the cart 20. Each brace 28 is formed by an upper arm or link 52 and a lower arm or link 53 interconnected by an over center hinge 54. The link 52 is pivoted at 55 to the beam 36, while the lower link 53 is pivoted to an end of the axle 46 that extends through T-fitting 42. A spring 56 is coiled around each end of the axle 46 and, as shown in FIG. 6, has its free ends 57 and 58 fixed to the leg 26 and brace arm 53, respectively. The springs 56 are stressed so as to urge brace 28 and legs 26 into their erected condition as shown in FIG. 1.

The wheels indicated generally by numeral 24 include at the front a pair of conventional wheels 60 carried by a yoke 61. Yoke 61 is suitably secured to an extension of the arm 53 of the brace 28. At the rear, a caster wheel 62 is secured to each T-fitting 43 to facilitate guiding of the cart. The auxiliary wheels 25 are adjustably secured to the depending angle 38 of the beam 36 by brackets 63, the brackets 63 being selectively secured to the desired ones of aligned mounting holes 64 by suitable fasteners (not shown).

The handle 29 is pivotably secured near the rear of the beams 36—36. The handle takes the configuration of a U and is formed from a single rectangular beam having a bight portion 66 interconnecting a pair of side arms 67, 68. The arms 67, 68 are pivoted at their ends upon a cross shaft 69, cross shaft 69 being anchored at its ends in a pair of brackets 70—70. Each bracket 70 is secured to and depends below its respective beam 36 at a location inward of the rear end of the table 35. A latching rod 71, to be described, interconnects the rails 67, 68 intermediate the shaft 69 and base 66. The handle, rearward of its pivot axis, provides an upper surface engageable with the under surface of said table to support the rearward end of said table.

Figure 7:
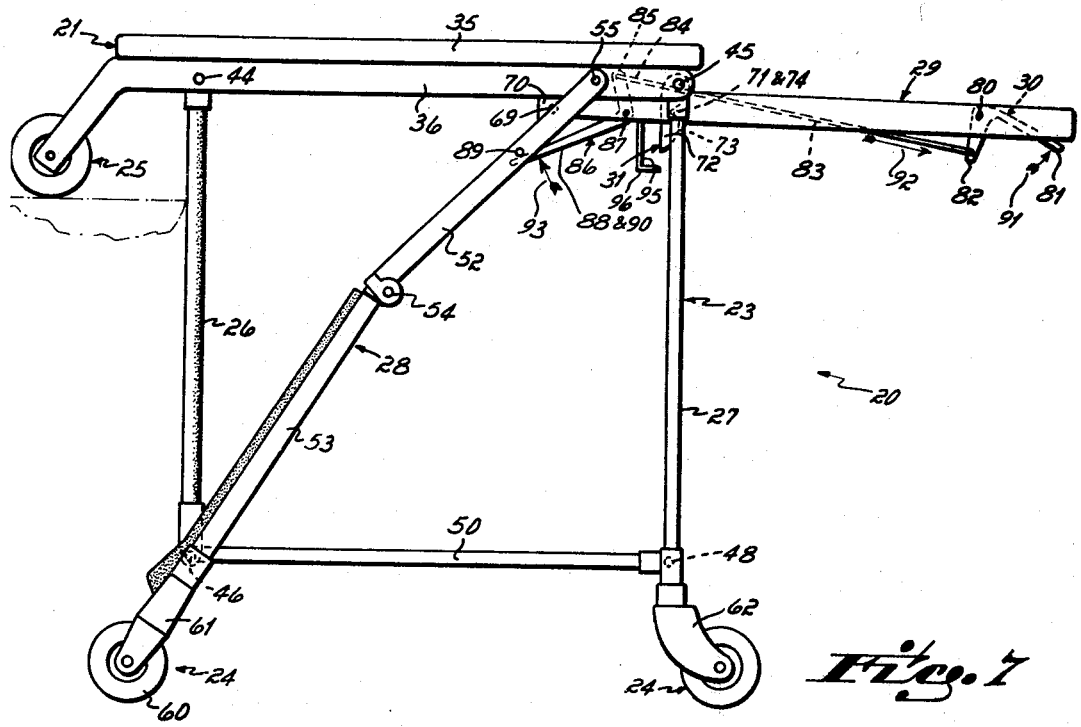

The handle 29 is selectively positionable between two positions, namely the generally vertical position depicted in FIG. 1 or the horizontal position of FIG. 7. The handle is latched in the push cart position by the latch mechanism 31 which comprises a pair of hook-shaped latch members 72 supported for pivotable movement on the tie bar 45. The latch members 72 are interconnected by a fixed bar 75 and are spring loaded into a normally latched position by a coil spring 76. Each latch member 72 has a tapered cam surface 73 and a horizontal latching ledge 74. When the handle 29 is raised and caused to pivot about the shaft 69, the latch rod 71 engages the tapered surface 73 of the latch and cams and latch in a clockwise direction, as viewed in FIG. 7, about the tie bar 45 and against the bias of spring 76. When the rod 71 engages the ledge 74, the latch is returned to its normal position by the spring 76 so as to capture the rod 71 and hold the handle in a raised position. Lowering of the handle is accomplished by pushing the rod 75 forwardly thereby disengaging the rod 71 from the ledge 74.

The operating lever 30 is secured to the rail 68 of the handle 29 by a pivot pin 80. As shown in particular in FIG. 7, the lever 30 is a bell crank having a manually manipulated free arm 81. Another arm 82 of the bell crank is pivotably connected to one end of a control rod or link 83. At its opposite end 84 the control rod is connected to an arm 85 of a bell crank 86. Bell crank 86 is fixed to a shaft 87 which is pivotable within the arms 67, 68 of the handle 29. The bell crank 86 has a second arm 88 which is positioned below and is in engagement with a cross rod 89 anchored to and extending between the upper links 52 of the braces 28. As best seen in FIG. 1, an arm 90 is fixed to the opposite side of the shaft 87 and is oriented similarly to the arm 88 of bell crank 86.

Thus, operative movement of the lever 30 in the direction of arrow 91 will pull the rod 83 in the direction of arrow 92 (see FIG. 7). Movement of the rod 83 in the direction of arrow 92 will pivot the bell crank 86 clockwise on shaft 87 and cause the arms 88 and 90 to raise the cross rod 89 as indicated by the arrow 93. Raising of the rod 89 effects pivotal movement of the upper link 52 of the brace 28 about the pivot 55 and moves the over center hinge 54 from its over center, locked position to release braces 28 and permit rearward swinging of legs 26, 27.

OPERATION

Referring now to FIGS. 1, 4, and 7–10 and to FIGS. 1 and 4 in particular, where the cart 20 is illustrated in a demonstrative position, the handle 29 is lowered so as to shorten the overall length and an article 22 is in place on the table 35. The handle 29 is raised (FIG. 7) causing the bar 71 to engage the slope 73 and cam the latch 31 to the left as viewed in FIG. 7, thus locking the handle 29 in its raised position. With the handle 29 raised, the cart 20 may be pushed in the manner of a shopper's cart or the like to the operator's vehicle.

Upon arrival of the operator with his cart at the vehicle (by way of example, a station wagon having a tailgate and floor illustrated by phantom lines in FIGS. 2, 3, and 7–10), the auxiliary wheels 25 are rolled onto the tailgate until the front leg 26 engages the edge of the tailgate (a plastic sleeve or similar substance may be used to cover the legs and thus protect the finish of the vehicle, if it is desired). When in this position, the operating lever 30 is manipulated to raise it in the direction of the arrow 91 so as to pull the rod 83 in the direction of the arrow 92. This movement in turn raises the arms 88, 90 in the direction of arrow 93 and breaks the over center hinge 54. Breaking of the over center hinge 54 causes the brace 28 to collapse and thus removes the diagonal support 28 for the framework 23 (FIG. 7). When the brace 28 is thus broken, the legs 26 and 27 are conditioned so as to permit their pivoting from a vertical attitude to a substantially horizontal position.

Figure 8:
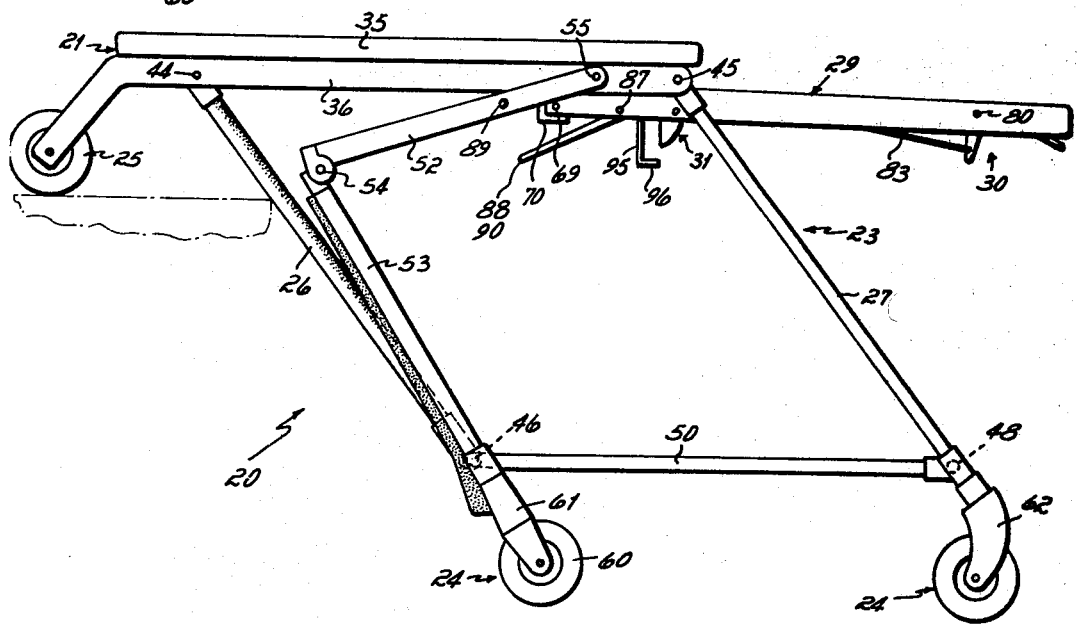

With the brace 28 broken, the cart is pushed into the wagon on its auxiliary wheels 25 to the position illustrated in FIG. 8. Pushing of the cart forces the front legs 26 against the edge of the tailgate and causes the parallelogram formed by the legs 26 and 27, the beam 36, and the rod 50 to be lowered into a collapsed position. The legs 26 slide along the tailgate and with the wheel 25 support the weight of the cart and its article.

Midway through the collapsing of the framework beneath the cart, the lower link 53 of the brace 28 engages the gate (FIG. 9). (The leading edge of the link 53 may be covered with plastic or the like to protect the finish of the vehicle if desired.) Continued pushing of the cart into the wagon effects the complete collapse of the framework 23 as viewed in FIG. 10. In FIG. 10, the main wheels 24 and the auxiliary wheels 25 are resting upon the floor.

A brace 95 is secured to the under side of the table 35. A flange 96 of the brace 95 rests on the axle 46 when the framework 23 is collapsed to preclude a complete and damaging collapse of the framework 23. This brace 95 is necessary only for extremely heavy loads that may be carried upon the table.

ALTERNATIVE FORM WITH RECESSED TABLE

Referring now to FIGS. 11, 12, and 13, an alternatively constructed cart is illustrated. The cart of this construction is similar in operative concepts, but differs primarily in its table structure. Specifically, the table is secured to the cart in a manner that will provide a table having a lower top surface than cart 20 to accommodate merchandise of greater heights. Therefore, similar structural components and details will not be described in detail. FIGS. 11 and 12 will, however, bear the same reference numeral as corresponding structural components and details except that they will be in the 100's series. New or different components and details will have unrelated reference numerals in the 200's series.

The cart 120, of FIGS. 11 and 12, includes a recessed table structure 200 which supports an article of merchandise (not shown) which may or may not be of a height greater than that depicted in FIG. 1 and indicated by the reference numeral 22.

A table 201 of the table structure 200 is rigidly secured to each beam 136 by a pair of L-shaped brackets 202, 203. The upper ends of each bracket 202, 203 are rigidly secured to the beam 136 by fasteners 207. Each bracket 202, 203 has a transversely oriented ledge 204 on its lower end, the ledges 204 underlying lateral side edges 205 of the table 201. The table 201 is rigidly secured to the ledges 204 by suitable fasteners (not shown).

In order to accommodate the recessed table structure 200, the front legs 126 are pivotably secured to the outer edges of the beam 136 by the stub shaft 144. Additionally, each leg is bent outwardly as at 208 and downwardly again as at 209. As seen in FIG. 12, the reverse bends 208, 209 maintain the legs 126 in a generally vertical attitude, while simultaneously displacing their lower ends in a lateral direction to position the T-fitting 142 so that it may rotatably embrace an axial extension 210 of the front axle 146. A hole (not shown) in wheel yoke 161 permits lateral protrusion of the extension 210.

A shortened table 211 is suitably secured, by means not shown, to the upper surface of the beams 136—136. The table 211 provides a limited additional display platform. Additionally, the table obstructs or hides from view the mechanical linkages of the latch structure 131 and of the operating lever 130.

As stated above, operation of the car 120 is identical in all respects to the cart 20.

What is claimed is:

1. A cart for conveying and demonstrating heavy articles comprising:
    a table for supporting an article,
    four legs pivoted at their upper ends to said table and and having wheels at their lower ends,
    releasable braces normally fixing said legs in perpendicular downwardly depending relation to said table,
    auxiliary wheels mounted at the forward end of said table,
    a handle pivoted at the rear end of said table and swingable between a position in which it projects rearwardly of said table and a position in which it projects downwardly,
    a releasable latch for holding said handle in its rearwardly projecting position, said latch permitting said handle to swing to its downward position,
    a brace release operator mounted on said handle, and
    a linkage connecting said operator for engagement with said brace to release said brace upon actuation of said operator.

2. A cart according to claim 1 in which said brace release operator and linkage comprise:
    a bell crank lever pivoted on said handle adjacent said braces and operable to effect release of said braces upon pivoting,
    said linkage connecting said bell crank lever to said operator to pivot said lever by manipulating said operator.

3. A cart according to claim 1 in which said releasable braces comprise:
    an over center toggle device at each side of said cart, each device including upper and lower links pivoted together, the upper link being pivoted to said table and the lower link being pivoted to one of said legs,
    a bar extending between upper links,
    an arm movably mounted on said handle for engagement with said bar,
    said operator being mounted adjacent the free end of said handle and said linkage connecting said operator to said arm.

4. A cart according to claim 1 in which said handle is pivoted at a location spaced inwardly from the rearward end of said table, said handle having an upper surface engageable with the under surface of said table for supporting the rearward end of said table.

5. A cart according to claim 4 in which said handle is generally U shaped with legs at each side of said cart,
    a bar connected between said legs at a location rearward of the pivotal location of said handle,
    said latch being mounted on said table and having a portion engaging the under surface of said rod to provide substantial support for said handle.

6. A cart according to claim 1 further comprising:
    a cross bar connected between the forward legs of said cart, and
    a brace projecting below the table, said brace engaging said cross bar when said cart is in collapsed condition to provide direct support of an article on said table.

7. A cart according to claim 1 in which said table comprises:
    a generally rectangular frame,
    brackets depending from said frame, and a plate supported by said brackets and recessed within said frame.

8. A cart according to claim 7, and a second plate supported on said frame at the rearward end thereof.

References Cited

UNITED STATES PATENTS

| | | | |
|---|---|---|---|
| 2,744,760 | 5/1956 | Welsh et al. | 280—36 |
| 2,786,692 | 3/1957 | Timpson | 280—36 |
| 2,841,438 | 7/1958 | Weil | 296—20 |
| 3,082,016 | 3/1963 | Pratt | 280—36 |
| 3,088,770 | 5/1963 | Weil et al. | 296—20 |

LEO FRIAGLIA, Primary Examiner

J. E. SIEGEL, Assistant Examiner